United States Patent Office 3,005,159
Patented Oct. 17, 1961

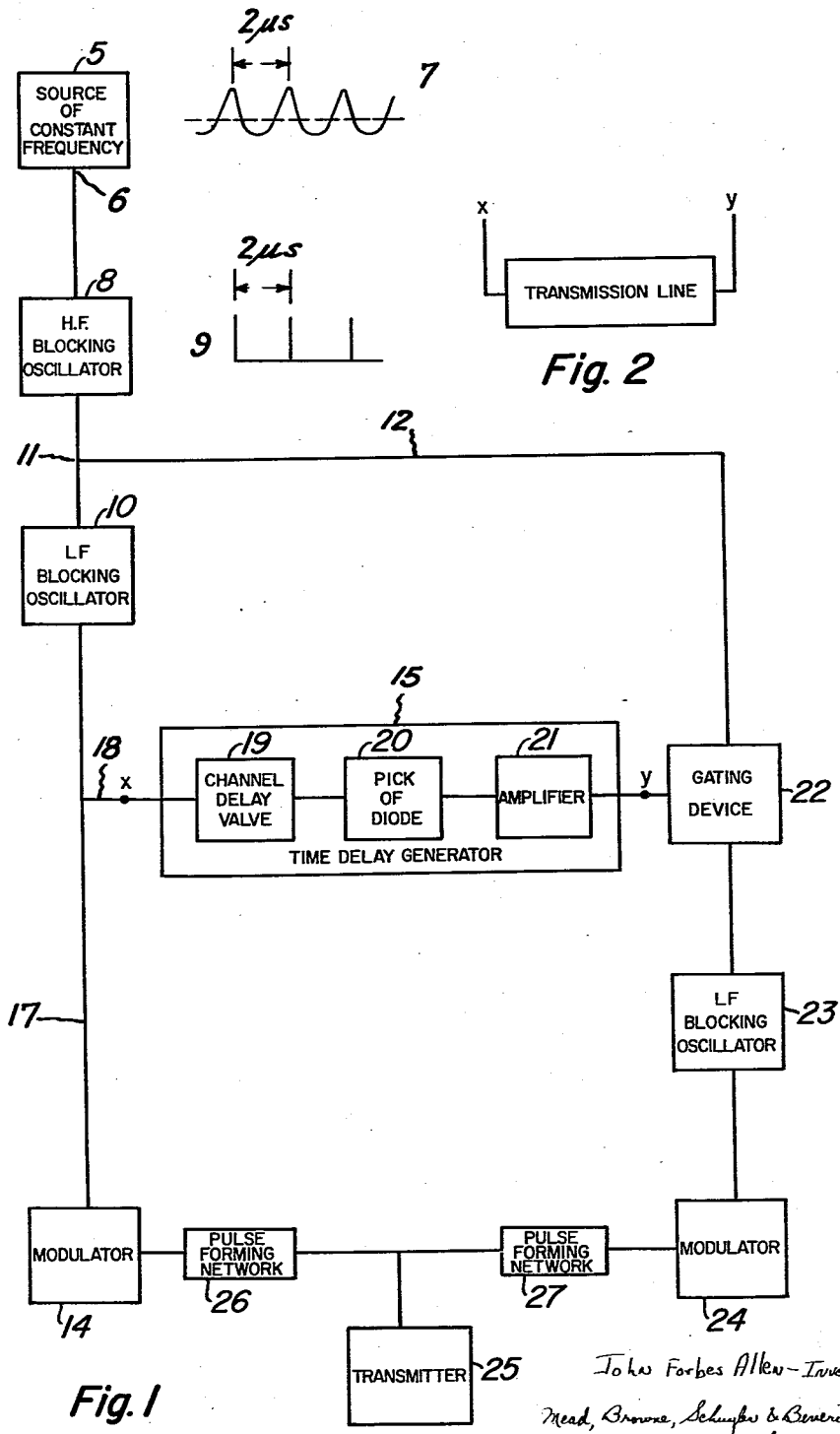

3,005,159
PULSE GENERATING SYSTEM FOR GENERATING ACCURATELY SPACED TIMING PULSES
John Forbes Allen, Maroubra, Sydney, New South Wales, Australia, assignor to Amalgamated Wireless (Australasia) Limited, Sydney, New South Wales, Australia
Filed July 22, 1959, Ser. No. 828,837
Claims priority, application Australia Oct. 17, 1958
6 Claims. (Cl. 328—62)

This invention relates to a pulse generating system for generating accurately spaced timing pulses and more particularly to a method of generating accurately spaced timing pulses for use in distance measuring equipment (DME).

In the Australian DME system the airborne apparatus interrogates a particular ground beacon by sending an accurately spaced pair of radio frequency pulses which are each 2 microseconds long. The spacing is set at 10, 14, 18 microseconds and so on at intervals of 4 microseconds out to 54 microseconds, giving twelve pulse separations. A given ground beacon is set to respond only to pairs of pulses with one particular interval of spacing between the pulses which constitute a pair.

It is necessary to generate the pulse pairs which designate the channels, accurately; i.e. space the pulses in each pair precisely so that they will be accepted by and only by the ground beacon for which they are intended.

In practice the aircraft station interrogates the ground beacon by sending about 100 pulse pairs per second. So that there is no possibility of two aircraft generating pairs of pulses which remain in perfect synchronism long enough for some false type of operation to occur, it is desirable that the circuit which generates the pulse pairs operates with some degree of randomness as to the precise instant at which the first pulse of a given pair is generated.

The present method of producing the desired pulse spacing is as follows: A free running multivibrator operates at about 100 cycles per second. The instant of switching of this circuit determines the instant of the start of the first pulse and the inherent instability of the multivibrator ensures the necessary degree of randomness referred to above. Simultaneously with the start of the first pulse a delay network comes into operation to generate the desired pulse spacing interval. Upon the generation of the desired time interval the second R.F. pulse is sent.

The method of channel generation outlined above has been fairly satisfactory for the 12-channel system at present used in Australia. The principal disadvantage of the system, however, is its limited long term accuracy. In particular the circuit (as used in practice) is not considered suitable for doubling the number of channels by continuing out at 4 microsecond intervals beyond 54 microseconds. The need for an inherently more reliable method of generating the channels has been evident for some time.

The principal object of the present invention is therefore to provide a simple method of generating pairs of timing pulses so that the spacing between the pulses forming a pair is precise and stable and at the same time maintains a satisfactory degree of randomness about the instant at which the first pulse in each pair starts.

The above objective is achieved, in accordance with the present invention, by an improved generating system for generating accurately spaced pairs of timing pulses comprising a source of frequency stabilised H.F. oscillations, means for converting the output waveform from said source into short duration control pulses of the same frequency, means for utilizing said short duration control pulses to cause a first L.F. pulse generator to produce pulses the time duration of which is short compared with the time interval between adjacent said H.F. control pulses; means for utilizing said L.F. pulses to produce the initial or reference pulse of said timing pulses; a delay network of variable time delay; means for applying said L.F. pulses simultaneously to said utilizing means and said delay network; and a gating circuit responsive to the pulses in the output of said network to selectively allow a pulse from said first mentioned means to trigger a second L.F. generator at the same frequency as said first L.F. generator to produce pulses accurately spaced from said reference pulses by an adjustable time interval controlled by said delay network.

For a more complete understanding of the invention and the manner in which it is to be carried out, attention is now directed to the following description in connection with the accompanying drawing in which FIG. 1 illustrates a simplified block schematic diagram of one suitable arrangement for carrying out the invention and FIG. 2 represents a time delay element suitable for connection across the points x—y in place of the rectangle 15 of FIG. 1.

The nature of the invention and manner in which the essential parts of the apparatus employed are required to function to carry it into effect will be readily understood from the following brief description of the embodiment illustrated in the simplified diagram.

Furthermore, since the invention resides in a system rather than in the specific construction of the individual networks the present disclosure is greatly simplified by the schematic representations of the individual networks. Those skilled in the art of radio communication by the use of electromagnetic waves will be fully aware of the specific construction of the individual networks. However, where a particular network constructed in accordance with known circuitry is required to produce specific results, the method by which this can be achieved will be explained in detail with reference to the drawing or reference directed to appropriate literature.

Referring to the drawing, a source 5 provides at the output connection 6 alternating potentials of substantially constant frequency and having a distorted wave form of the type shown at 7. These requirements may be met, for example, by the use of a crystal controlled oscillator which is coupled to the output connection 6 through one or more amplifiers adapted for so-called class B or class C operation.

As the arrangement suggested above and the various alternatives which may be used for producing a stabilised frequency with an output waveform distorted in such a manner as to provide the clearly defined pulses suitable for synchronising a pulse generator such as a blocking oscillator, are well understood by those skilled in the art, a detailed description of them is not considered necessary. The principal consideration is that whatever arrangement is used the output waveform should be such as will produce satisfactory triggering of a generator of H.F. pulses in synchronism with the frequency of the stabilised source or a suitable multiple or submultiple thereof.

In the present example a blocking oscillator of the type described in the National Bureau of Standards Technical News Bulletin of May 1952, on pages 78–79, is used to generate pulses 9 of fast rise time and short duration at a repetition frequency of 500 kc./s. per second in synchronism with the H.F. energy applied to its input through the connector 6.

The methods employed in the construction and operation of blocking oscillators are well understood. They may be regarded as a tuned plate, transformer coupled feedback oscillator, adapted when triggered by an actuating voltage to produce output pulses of short duration having fast rise and fall times. The speed with which the output pulse rises and falls, the duration of the pulse and the rate at which it can be repeated, are determined to a large extent by the characteristics of the transformer used to couple the grid and plate circuits. The new transformer which is employed in the blocking oscillator circuit described by the Bureau of Standards in the above reference will enable the requirements specified above to be easily fulfilled.

Any known type of pulse generator, which is adapted to comply with the required operating characteristics may be used to carry out the functions of the blocking oscillator which is employed in the present example, if desired.

As stated above the output energy in the connection 6 is used to drive a blocking oscillator 8 at the same frequency so that if, for example, the frequency of the output energy from the source 5 in the connection 6 is stabilised at 500 kc./s. per second, the blocking oscillator 8 will be triggered by the waveform 7 to produce in its output circuit very short sharp pulses 9 with a spacing of 2 microseconds between pulses corresponding to a repetition frequency of 500 kc./s.

The pulses 9 from the output circuit of the blocking oscillator 8 are simultaneously fed to a second pulse generator such as the blocking oscillator 10 and a gating device 22 through connections 11 and 12 respectively.

The L.F. oscillator 10 is required to generate output pulses at a repetition frequency which corresponds with the repetition frequency of the pairs of pulses which are to be produced. These output pulses, as previously pointed out, should have a fast rise time and a duration which is short compared with the time interval between the pulses 9 produced by the oscillator 8 in the output connector 11. A blocking oscillator which is constructed in a manner similar to that described in connection with the oscillator 8 may be used to fulfil the requirements of the oscillator 10. The blocking oscillator 10 is, under normal conditions, a free running low precision device which is adapted to be triggered in synchronism with appropriately occurring pulses 9 from the oscillator 8 at a frequency which corresponds to the required repetition frequency of the time spaced pulse pairs.

In certain circumstances, such as for example where the pairs of pulses are to be repeated at a constant frequency, the relationship between the output frequencies of the oscillators 8 and 10 may be made such that the desired output frequency from the oscillator 10 will be produced with a stability corresponding to that of the source 5.

In carrying out the present invention in its application to a DME system stabilisation of the operating frequency of the oscillator 10 is undesirable for various reasons, which will be made clear as the description proceeds.

The pulses from the oscillator 8 are used in the present example for the purpose of stabilising the starting time of each operating cycle of the oscillator 10 irrespective of the repetition frequency of the cycle. This enables each operating cycle of the oscillator 10 to be accurately referenced in time with respect to the specific pulse from the oscillator 8.

For example, if the pairs of time spaced pulses are required to be produced 100 times per second, then the frequency determining constants of the oscillator should be adjusted to cause it to operate at a corresponding frequency. That is to say, the frequency to which the oscillator 10 is adjusted should be such that it can be triggered in synchronism with stabilised pulses from the oscillator 8 by individual pulses from that source about every 1/100 of a second. However, if the frequency adjustment of the oscillator is changed either by design or due to some instability of the constants of the frequency determining elements of the circuit, it will no longer be triggered every 1/100 of a second. Instead, those pulses which are numerically spaced apart an amount corresponding to the changed frequency of the oscillator 10 will carry out the triggering function.

If, due to the circumstances outlined above, the frequency of the oscillator is increased to, say, 111 cycles per second (c.p.s.) or some intermediate or greater value, it will be triggered by pulses from the oscillator 8 which are numerically spaced about 1/111 of a second apart.

In like manner, if the frequency of the oscillator 10 decreases to, say, 90 c.p.s., or a lower or intermediate value it will be triggered in synchronism with pulses from the oscillator 8 that are spaced an amount equal to the approximate period of the chosen frequency.

These variations in the operating frequency of the oscillator 10 will of course produce a corresponding variation in the frequency at which the pulse pairs are produced and this would appear to be undesirable. On the contrary, such a variation is very necessary in certain circumstances.

For example, where the pairs of time spaced pulses which are generated in accordance with this invention are to be used to define interrogation channels for beacon selection in a DME system stability of the repetition frequency is not essential. In fact, a degree of random variation in the operating frequency of the oscillator 10 is a definite advantage in order to prevent false operation of the system. The purpose in repeating the time spaced pulses a number of times per second is to ensure that a sufficient number of pulse pairs with the specified time spacing between pulses are received by the required beacon to cause it to be brought into operation.

The frequency of 100 p.p.s. was used in the above explanation of the operation of the oscillator 10 because it corresponds with the nominal repetition frequency presently employed in the transmission of interrogation pulse pairs in the Australian DME system.

If, however, the frequency of the oscillator 10 was accurately maintained in all aircraft, it might happen that a beacon replying to one aircraft would be unable to reply to a second interrogating aircraft. This will occur when the interrogation from the second aircraft arrives during the transponder dead time, when the receiver is paralysed. If both interrogations were at exactly the same repetition frequency this condition would continue, and no reply would be sent to the second aircraft. This is generally referred to as "beacon stealing."

An additional disadvantage is that the interrogator-responder in the second aircraft would lock-on to the response to the first aircraft, and thus indicate an incorrect distance. In order to overcome these disadvantages the repetition frequency of the interrogating pulses should be determined by a free running low precision device which is subject to a certain amount of frequency drift. For example, the actual frequency of operation is allowed to vary by minus 10 to plus 15 cycles from the nominal frequency of 100 cycles presently used.

From the above description it should be apparent that although the pulses 9 from the oscillator 8 are not employed to stabilise the nominal operating frequency of the oscillator 10, they do, however, provide a highly stabilised starting time for each operating cycle of the oscillator 10, irrespective of the repetition frequency of the cycle. In this way the initial pulse of each pulse pair of time spaced pulses which are to be produced in accordance with the present invention is accurately referenced to a specific pulse 9 from the oscillator 8 hereinafter called the "reference pulse."

Furthermore, although the free running frequency selected for the blocking oscillator 10 in the present example is relatively low compared to the frequency of the H.F. oscillator 8, the duration and rise time of the pulses generated in its output circuit should be as similar as possible to the duration and rise time of the triggering pulses applied to its input from the oscillator 8.

In any case it is essential for the proper functioning of the present invention that the duration or length of the pulse produced in the output circuit of the oscillator 10 should be short in comparison with the pulse repetition spacing of the pulses generated by the H.F. oscillator 8. The requirement stated above is necessary to ensure that the blocking oscillator 10 only starts its triggered cycle on one of the output pulses 9 from the oscillator 8 and it cannot start between them. It is obvious that the shorter the duration of the pulses produced by the oscillator 10 and the faster their rise time, the greater will be the certainty that the oscillator 10 will only be triggered by pulses from the oscillator 8 which are numerically spaced at the required operating frequency of the oscillator 10. For the operating conditions such as are employed in the present example, where the H.F. oscillator 8 has an output frequency of 500 kc./s. corresponding to pulse spacing of 2 microseconds, a blocking oscillator which will produce output pulses having a fast rise time of about 0.02 microsecond and a short duration of about 0.1 microsecond, is satisfactory.

If, however, without altering the output frequency of the oscillator 8 from the value of 500 kc./s. used in the present example the rise time of the pulse produced by the oscillator 10 is made faster than 0.02 microsecond and the duration of the pulse less than 0.1 microsecond, a greater degree of precision will be obtained in the triggering of the oscillator 10 by particular pulses from the oscillator 8.

Conversely the same degree of precision in the relationship between the two sets of pulses could also be obtained by maintaining the rise time and duration of the pulses produced by the oscillator 10 constant at the values specified above by way of example, and reducing the frequency of the pulses applied to its input to a lower value, e.g. 250 kc./s.

As the principal objective of the present invention is to generate pairs of timing pulses in which the pulses forming each pair may be selectively spaced from each other by an accurate and stable specified time interval, the frequency of the stabilised blocking oscillator 8 would be determined by the specific variation in time interval required.

In the DME system presently used in Australia, the spacing between the pulses forming each pair is selectively variable in steps of 4 microseconds to provide 12 readily selectable pairs of channelling pulses having a different and predetermined time interval between the pulses of each pair. For example, starting with an arbitrary reference spacing of 10 microseconds between the pulses forming the first channel pair, the spacing interval is increased by 4 microseconds for each succeeding channel pair out to a spacing of 54 microseconds to provide the required 12 channels.

If the present invention is employed to fulfil the requirements of the channelling arrangements as set out above, the repetition frequency of the pulses in the output of the oscillator 5 would have to be 250 kc./s. in order to provide the required 4 microsecond difference in spacing between pulses. Similarly, if a spacing increment of 1 microsecond was required, the frequency of the oscillator 5 would have to be 1000 kc./s.

Should it be required to double the number of channels that can be selected within the present specified time channel of, e.g. 54 microseconds, this could be readily carried out with the arrangement in accordance with the present invention by setting the frequency of the oscillator 5 at 500 kc./s. This would make available stabilised pulses spaced 2 microseconds apart. These pulses could be selected in the manner briefly outlined below with respect to the drawing to provide 24 separate channels which are distinguished by a difference of 2 microseconds' time in the spacing interval between the pulses forming the pulse pairs of each channel.

For example, when the blocking oscillator 10 is triggered the resulting pulse generated in its output is simultaneously fed to the input of a first modulator 14 and the input of a time delay generator 15 through suitable connections 17, 18 respectively. The modulator 14 is triggered by the pulse applied through the connector 17 and causes the first or "gating" pulse of the time spaced pulse pair to be transmitted by the transmitter 25. The pulse fed to the input of the time delay generator 15 is delayed during its passage through the network for a predetermined time corresponding to the desired time delay between the pulses in the pulse pair to be transmitted.

The delayed pulse in the output of the network 15 is used to open a normally blocked gating valve 22 to allow one and only one pulse fed from the 500 kc./H.F. oscillator 8 through the connector 12 to be passed to a third blocking oscillator 23. When the oscillator 23 operates it triggers a second modulator 24, thereby causing the second or "triggering" pulse of the time spaced pulse pair to be transmitted by the transmitter 25. The gating and triggering pulses are so called because the first is used to open the coincidence gate in the transponder and to trigger the transponder transmitter in conventional systems of DME.

The time interval between the pulses forming the pulse pair may be progressively increased or decreased in steps of 2 microseconds by selectively increasing or decreasing the time delay of the pulse fed through the network 15 to the gating valve 22.

Two pulses, the gating pulse and the trigger pulse are thus transmitted for each cycle of the initiating oscillator 10, that is, approximately 100 times per second in the present example.

The method of producing time spaced pulses in accordance with the present invention as briefly explained above will now be described in greater detail.

In order to avoid any possibility of confusion, the operating frequencies of the sources 5, 8 and 10 are the same as those used in the previous description.

H.F. energy, the waveform of which is distorted in the manner previously described, is fed from a stabilised H.F. frequency source 5 through the connnector 6 to a convenient input of a H.F. blocking oscillator 8. The operating frequency of the oscillator 8 determined in accordance with the requirements set out above, is selected as 500 kc./s. for the purpose of the present explanation in order to provide output pulses which are spaced 2 microseconds apart.

In this case the frequency of the distorted energy from the source 5 which is fed through the connector 6 must be such as will cause synchronous triggering of the oscillator 8 at the required frequency of 500 kc./s.

Although not essential, it is desirable that the oscillator 8 should be biassed, such as for example, by the application of a suitable negative biassing potential to its control grid. This will ensure that it must be triggered by the stabilised and distorted waveform fed to its input through the connector 6, and will not free run if the triggering pulses fail.

The frequency stabilised short, sharp pulses 9 produced in the output of the oscillator 8 are fed to the input circuits of an oscillator 10 and a gating device 22 through suitable connectors 11 and 12 respectively. A low precision free running blocking type oscillator, constructed and adapted to operate in the manner previously described, is used as the oscillator 10.

The pulses fed from the oscillator 8 through the connector 11 are used to trigger the oscillator 10 and provide a stabilised starting time for each operating cycle of the oscillator 10, irrespective of the repetition frequency of the cycle. This will cause each operating cycle or in other words, each output pulse, produced by the oscillator 10 to be accurately referenced to a specific pulse 9 from the oscillator 8.

The frequency determining elements of the oscillator 10 are adjusted to provide pulses of the previously specified character in its output circuit at a repetition frequency of approximately 100 c.p.s.

It is well known that just before a blocking oscillator produces its main output pulse due to true blocking oscillator action, its output consists of a train of pulses of growing amplitude which result by amplifier action of the input synchronising pulses. However, the main output pulse is so very much larger than those which precede it, that it is easily separated out by an amplitude discriminator.

The pulses produced in the output circuit of the oscillator 10 are fed to the input circuits of a modulator 14 and a time delay generator 15 through suitable connectors 17 and 18 respectively. The first modulator 14 and also the second modulator 24 are used to modulate a transmitter 25 and may be constructed in any convenient known manner. For example, they may be grid controlled gas filled triodes of the so-called thyratron type which are normally cut off by a negative grid bias similar to the modulators used for the same purpose in the present Australian system of DME. In like manner also the modulators 14 and 15 may be coupled to the transmitter 25 through pulse forming networks 26, 27 respectively.

The time delay generator 15 may be similar to that employed for the same purpose in the system of DME at present used in Australia and consist of the cascade arrangement of a so-called "channel delay valve" 19, a pickoff diode 20 and a trigger amplifier valve 21. Alternatively, it may be an artificial transmission line (generally indicated by the rectangle 28 of FIG. 2) employing lumped constants connectable between points x and y of FIG. 1 in place of delay generator 15, or any other device which can be selectively adjusted to provide a series of increments in time delay for a pulse transmitted through the network with a predetermined spacing in time between the increments within the specified time channel (54 microseconds in the present example). The manner in which the conventional time delay generator 15 using the cascaded arrangement referred to above, functions to control the time delay of a pulse passing through it is briefly as follows:

The channel delay valve 19 is a so-called "pentagrid" or like valve having two separate control grids connected as a Miller integrator (see Electronic & Radio Engineering by R. E. Terman (4th edition), pages 652–655).

The pulse applied to the channel delay valve 19 from the output circuit of the oscillator 10 causes it to generate a negative going sawtooth waveform. This sawtooth is applied to the cathode of the pickoff diode 20. A positive channel delay voltage of selectable value is applied to the anode of the diode 20 by the channel selector switch. When the sawtooth voltage becomes more negative than the channel delay voltage, the pickoff diode 20 will conduct and a pulse is generated at the instant the diode commences to conduct. The delay of this pulse with respect to the trigger pulse fed to the first modulator valve 14 depends on the setting of the channel selector switch. The delayed pulse is amplified in the trigger amplifier 21 and then fed in the present example to the input circuit of the gating device 22.

The pulses fed to the first modulator 14 from the output circuit of the oscillator 10 are required to trigger the first modulator 14 and cause the first or so-called ranging pulse to be transmitted by the transmitter 25.

If, as in the present example, the first modulator employs a gas triode which is normally cut off by a negative bias applied to its control grid, the triggering pulses from the oscillator 10 will have to be of positive polarity and of sufficient amplitude to overcome the negative biassing potential. Pulses of the required amplitude and polarity may be derived from the oscillator 10 in any conventional manner.

Pulses fed to the input of the time delay generator 15 from the oscillator 10 through the connector 18 are passed through the network 15 to the input of a gating device 22. During their passage through the network 15 the pulses are subjected to a predetermined delay the value of which may be preselected.

Any conventional arrangement which will fulfil the requirements of the present invention may be used as the gating device 22.

The principal requirement is that the gating device should function to selectively pass only that one of the stabilised H.F. pulses applied to its input at accurate and stable specified time intervals (2 microsecond intervals in the present example) from the oscillator 8 through the connector 12, which is coincident in time with the delayed pulse applied to its input from the time delay generator 15.

For example, as previously pointed out, each pulse in the output circuit of the oscillator 10, irrespective of the repetition frequency of the oscillator 10 is accurately referenced to a particular output pulse 9 from the oscillator 8, hereinafter referred to as the reference pulse.

If there is no delay whatever in the system, the two pulses, i.e. the output pulse from the oscillator 10, fed through the time delay generator 15, and the referenced or triggering pulse 9 from the H.F. oscillator 8 fed through connector 12, will arrive at the input of the gating device 22 at approximately the same time. As a result of the time coincidence of the pulses referred to in its input circuit, the gating device 22 will open and permit the reference H.F. pulse 9 to pass through it to the following utilisation circuits.

On the other hand, if the output pulse from the oscillator 10 is subject to a selected delay of, say 10 microseconds, in its passage through the time delay generator 15 it will arrive at the input of the gating device 22 coincident in time with a pulse 9 which arrives at the input of the gating device 22 from the oscillator 8 through the connector 12, 10 microseconds after the reference pulse 9 which triggered the oscillator 10 to produce the output pulse fed from the generator 15.

As the pulses 9 which are fed to the input of the gating device 22 through the connector 12 have a stabilised repetition frequency of 500 kc./s., there will be a very accurate and stable time spacing of 2 microseconds between the adjacent pulses 9.

An output pulse from the oscillator 10 which is delayed 10 microseconds in its passage through the generator 15 will therefore, in the present example, arrive at the input of the gating device 22 at the same time as the fifth pulse 9 arriving at the gate through the line 12 from the oscillator 8, after the H.F. reference pulse 9 which triggered the oscillator 10 to produce the output pulse.

The time coincidence of these two pulses in the input of the gating device 22 will cause the gate 22 to open and allow the fifth H.F. pulse, i.e. the pulse which is spaced 10 microseconds away from the triggering or reference pulse, to pass through to its output connector 30.

If the time delay of the pulse which is applied to the input of the gating device 22 from the output of the time delay generator 15 is increased by 2 microseconds from 10 to 12 microseconds, then the sixth pulse 9 following the reference pulse would be selected instead of the fifth.

From the above explanation it should be obvious that if during its passage through the time delay generator 15 the output pulse from the oscillator 10 is subjected to a selected time delay of 2 microseconds, or any time delay which is a multiple of 2 microseconds within the allotted time channel of, say 54 microseconds, any one of the 27 pulses which follow the reference pulse through the connector 12 from the oscillator 8 may be selected by time coincidence in the input of the gating device 22.

In this manner any output pulse from the oscillator 10 can be caused to select that particular one of the 27 pulses referred to the time spacing of which with respect to its H.F. reference pulse or the triggering pulse fed to the input of the first modulator 14, corresponds to the desired time interval between the pairs of pulses which are to be produced.

A pulse will be produced in the output of the gating device 22 at an accurate and stable time interval with respect to the triggering pulse fed to the input of the first modulator 14 on the application of each time delayed pulse from the generator 15 to the input of the gating device 22, irrespective of wide variations in the repetition frequency of the time delayed pulse.

Furthermore, the time delay given to the output pulse from the oscillator 10 in its passage through the generator 15 may be allowed to vary within comparatively wide limits without affecting the accuracy and stability of the time interval between the pulse generated in the output of the gating device 22 and the H.F. reference pulse which triggered the oscillator 10. By suitable adjustment of the time constant of the input circuit of the gating device 22 variations may be permitted of up to ±¾ of a microsecond in the value of the selected time delay without effecting the selection of the required pulse 9 from the connector 12 and consequently the accuracy or stability of the desired spacing interval between the triggering of the oscillator 10 and the pulse produced in the output of the gating device 22.

From the above it will be seen that the timing circuit is used to provide a coarse gate and the precise spacing of the pulses is effectively (to the degree required in the present problem) determined by the frequency of the frequency stabilised pulse generator 8.

The time interval determining pulse produced in the output circuit of the gating device 22 are utilised to trigger a further oscillator 23. A blocking type oscillator which is similar to that described in connection with the oscillator 10 is used as the oscillator 23. This ensures that the oscillator 23 will maintain the symmetry of the circuit by introducing the same delay between its triggering pulse and its output pulse as that which occurs between the accepted triggering pulse 9 fed to the oscillator 10 and the resulting output pulse.

The pulses produced in the output circuit of the gating device 22 are used to trigger the blocking oscillator 23. As the triggering pulses applied to the blocking oscillator 23 are usually required to be of positive polarity, they may be obtained from the cathode circuit of the gating valve 22. When the oscillator 23 is triggered it is caused to produce a pulse in its output circuit. This pulse is used to trigger the second modulator 24 to cause the second or "triggering" pulse of the required time spaced pair of pulses to be transmitted by the transmitter 25. As the thyratron type valve in the second modulator 24 is normally cut off by a negative bias, the output pulse from the oscillator 23 will have to be of positive polarity and of sufficiently large amplitude to overcome the negative bias and cause the valve to conduct.

The first pulse of the precisely spaced pair of pulses produced in accordance with the first invention is available at the output of either the oscillator 10 or the first modulator 14 and the second pulse spaced by the requisite time interval from the first is available at the output of either the oscillator 23 or the second modulator 24.

In the Australian system of DME each pulse of the time spaced pair transmitted by the transmitter for beacon interrogation is required to be of 2 microseconds' duration. The modulators 14 and 24 are therefore connected to the transmitter 25 through pulse forming networks 26, 27 respectively. Each individual pulse forming network 26, 27 functions to transform the pulse received from the output circuit of its associated modulator 14, 24 into a pulse of predetermined duration before applying it to the transmitter 25. Thus each modulator, with its associated pulse-forming network, causes the transmission of one pulse of the time spaced pair.

From the foregoing description it will be seen that a pulse generating system constructed in accordance with the present invention will produce two pulses in each cycle of an oscillator which controls the repetition frequency. The first pulse is coincident with the initiation of the oscillating cycle of the oscillator and the second of which is delayed by a selectable and predetermined amount. The accuracy and stability of the spacing is determined by a frequency stabilised H.F. source, such as for example a crystal controlled oscillation generator.

I claim:

1. An improved generating system for generating accurately spaced pairs of timing pulses comprising a source of frequency stabilised high frequency oscillations; means for utilising the output waveform from said source to trigger a high frequency pulse generator adapted to produce high frequency pulses in its output circuit in synchronism with the frequency of said source; means for applying said high frequency output pulses directly to a first low frequency pulse generator to cause said first low frequency pulse generator to produce low frequency output pulses, the time duration of which is short compared with the time interval between adjacent said high frequency output pulses; means for utilising said low frequency output pulses as the initial or reference pulses of said timing pulses; a delay network of variable time delay; means for applying said low frequency output pulses simultaneously to said utilising means and said delay network; and a gating circuit responsive to the pulses in the output of said network to selectively allow a high frequency output pulse applied directly to said gating circuit from the output of said high frequency pulse generator to be passed through said gating circuit to directly trigger a second low frequency pulse generator at the same frequency as said first low frequency pulse generator to produce pulses accurately spaced from said reference pulses by an adjustable time interval controlled by said network.

2. An improved generating system for generating accurately spaced pairs of timing pulses comprising a source of frequency stabilised high frequency oscillations, means for utilising the output waveform from said source to trigger a high frequency blocking oscillator adapted to produce high frequency pulses in its output circuit in synchronism with the frequency of said source; means for applying said high frequency output pulses directly to a first low frequency blocking oscillator to cause said first low frequency blocking oscillator to produce low frequency output pulses the time duration of which is short compared with the time interval between adjacent said high frequency output pulses; means for utilising said low frequency output pulses as the initial or reference pulses of said timing pulses; a delay network of variable time delay; means for applying said low frequency output pulses simultaneously to said utilising means and said delay network; and a gating circuit responsive to the pulses in the output of said network to selectively allow a high frequency output pulse applied directly to said gating circuit from the output of said high frequency blocking oscillator to be passed through said gating circuit and directly trigger a second low frequency blocking oscillator at the same frequency as said first blocking oscillator to produce pulses accurately spaced from said reference pulses by an adjustable time interval controlled by said network.

3. The invention as claimed in claim 2, characterised in that the said first low frequency blocking oscillator is a free running low precision device which is adapted to be triggered in synchronism with appropriately occurring pulses from the said high frequency blocking oscillator, at a frequency which corresponds to the required repetition frequency of said spaced pairs of timing pulses.

4. The invention as claimed in claim 2, characterised in that the duration and rise time of the pulses generated in the output of said first low frequency blocking oscillator is similar to the duration and rise times of the pulses produced in the output of said high frequency blocking oscillator.

5. The invention as claimed in claim 2, characterised in that the pulses produced by said high frequency blocking oscillator and said low frequency blocking oscillator have a rise time faster than 0.02 microsecond and a duration of less than 0.1 microsecond.

6. The invention as claimed in claim 2, characterised in that said reference pulses produced by said first low frequency blocking oscillator and the associated accurately spaced pulses produced by said second low frequency blocking oscillator are applied through individual modulating devices to a common transmitter.

References Cited in the file of this patent

UNITED STATES PATENTS

| | | |
|---|---|---|
| 2,534,862 | Fox | Dec. 19, 1950 |
| 2,713,120 | Mostofsky et al. | July 12, 1955 |
| 2,790,075 | Nelson | Apr. 23, 1957 |
| 2,815,504 | Clark | Dec. 3, 1957 |
| 2,817,759 | Thompson | Dec. 24, 1957 |
| 2,829,250 | Kushner | Apr. 1, 1958 |